Oct. 30, 1962     S. A. WEBER     3,060,726
HYDROGEN GAUGE
Filed Feb. 7, 1957     2 Sheets-Sheet 1
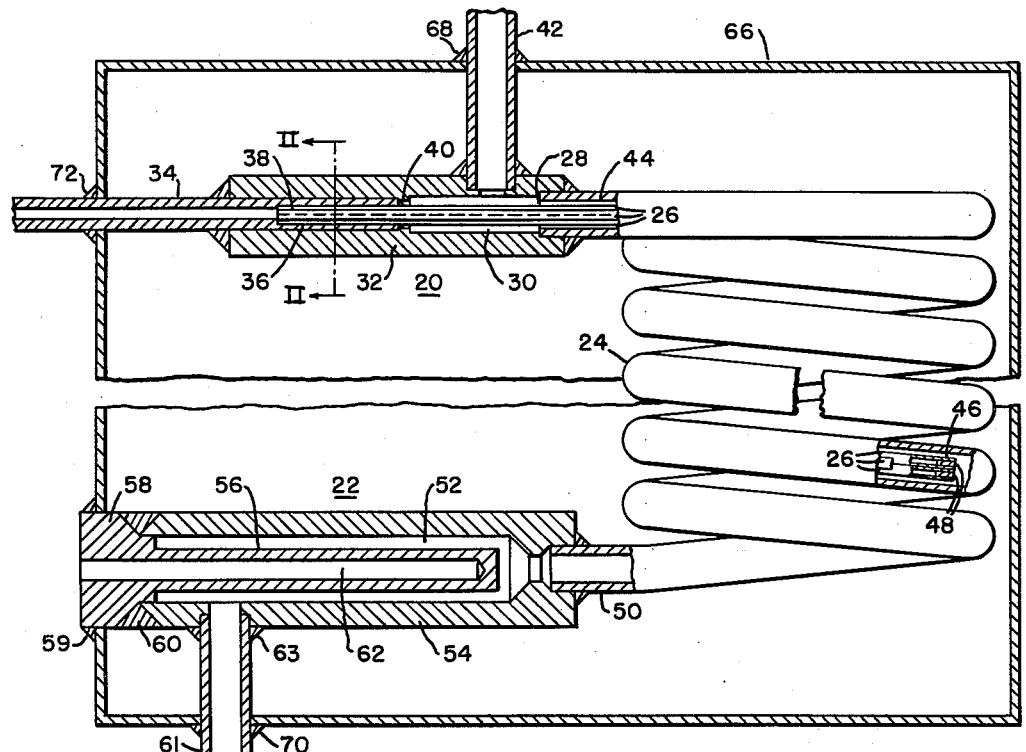
Fig. 1
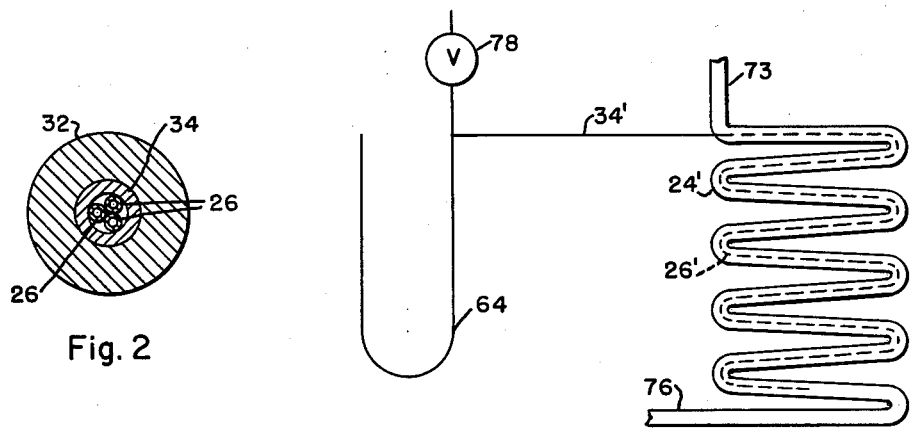
Fig. 2
Fig. 3
WITNESSES
Leon J. Taja
Donald J. Smith
INVENTOR
Sylvester A. Weber
BY
Arthur T. Stratton
ATTORNEY

United States Patent Office 3,060,726
Patented Oct. 30, 1962

3,060,726
HYDROGEN GAUGE
Sylvester A. Weber, Pittsburgh, Pa., assignor to Westinghouse Electric Corporation, East Pittsburgh, Pa., a corporation of Pennsylvania
Filed Feb. 7, 1957, Ser. No. 638,847
8 Claims. (Cl. 73—53)

The present invention relates to a hydrogen gauge for measuring the hydrogen content of a liquid and for maintaining the amount of hydrogen at a given concentration, and more particularly, to a hydrogen gauge adapted for use in pressurized liquid systems.

There are many applications wherein water or other liquid is maintained in sealed systems under extremely high pressures and at elevated temperatures. Such applications include flash boilers, evaporators or heat exchangers, in which water or other liquid is maintained in the superheated state. In these systems it is essential to maintain a specified concentration of dissolved hydrogen in the water utilized therein. An excess of hydrogen dissolved in the pressurized water tends to reduce the corrosive action of the water upon the structural components of the system. It is well known that the corrosiveness of pressurized water is accentuated and accelerated at the extremely high temperatures, which may be in the neighborhood of 400 to 600° F. employed in many present-day systems. At these high temperatures the water undergoes a partial or equilibrium dissociation according to the following equation:

$$2H_2O \rightleftharpoons 2H_2 + O_2$$

The liberated oxygen then reacts chemically with the materials of the structural components in the pressurized system to form the corresponding oxides. By increasing the normal hydrogen concentration in the water at a given temperature, the equilibrium equation cited above is driven to the left, with the result that the free oxygen in the system and the corrosive effect thereof is diminished greatly. Additionally, the reductive property of hydrogen serves to counteract directly the corrosive effects upon the system resulting from the chemical activity of the oxygen and of other oxidants dissolved or otherwise contained in the system.

To afford a necessarily precise control of the hydrogen concentration, it is desirable to monitor continuously the hydrogen content of the water and to provide means for maintaining the dissolved hydrogen concentration at a predetermined level. The degree of control heretofore has been seriously limited by the analytical problems encountered in measuring the hydrogen content in the coolant system.

In the past it has been the practice to remove an appropriate water sample or other liquid containing the dissolved hydrogen gas by means, for an example, of a high pressure steel bomb. Following removal in this fashion, the water is degassified and the volume of gas extracted is measured and analyzed. Although this method has proved feasible for many applications, the time consumed in withdrawing and analyzing the sample has limited the degree of control which can be afforded over the concentration of hydrogen in the water. Furthermore, the use of the steel bomb requires special plumbing connections for insertion and removal in highly pressurized systems, which in present day applications may exceed 2000 p.s.i. The apparatus required to carry out the analysis of the extracted gas sample consists mainly of fragile glassware which is undesirable for the quick performance of analyses in the field. Further, experienced personnel are required to perform the analyses and to interpret the results thereof. As stated heretofore, this type of analysis is time consuming, and as a consequence, usually cannot be done often enough to indicate undesirable fluctuations of the dissolved hydrogen content in the liquid system.

Accordingly, an object of the invention is to provide a novel type of hydrogen gauge which can be permanently coupled in the system in which the gauge is utilized.

Another object of the invention is to provide a novel type of hydrogen gauge to obviate the necessity of removing a liquid sample from the system to measure the hydrogen content thereof.

Yet another object of the invention is to furnish an efficient and inexpensive hydrogen gauge requiring only minimal skill for the utilization thereof.

A still further object of the invention is to furnish a hydrogen gauge from which the hydrogen concentration of the associated system can be read directly and continuously.

Another object of the invention is to provide a hydrogen gauge adapted to be inserted permanently in a pressurized liquid system and to withstand the extremely high pressures and temperatures developed therein.

Still another object of the invention is to provide means for the convenient and accurate addition of hydrogen to a liquid system.

Yet other objects of the invention are to provide a method for analyzing and continuously monitoring the dissolved hydrogen content of a pressurized liquid system and to provide a method for maintaining the dissolved hydrogen concentration at a predetermined level.

These and other objects, features and advantages of the invention will be made apparent during the ensuing description of exemplary forms of the invention, which description is to be taken in conjunction with the accompanying drawings, wherein:

FIGURE 1 is an elevational view partly in section of one form of hydrogen gauge constructed according to this invention;

FIG. 2 is a sectional view taken along lines II—II of FIG. 1;

FIG. 3 is a schematic view of the hydrogen gauge; and

Figure 4:
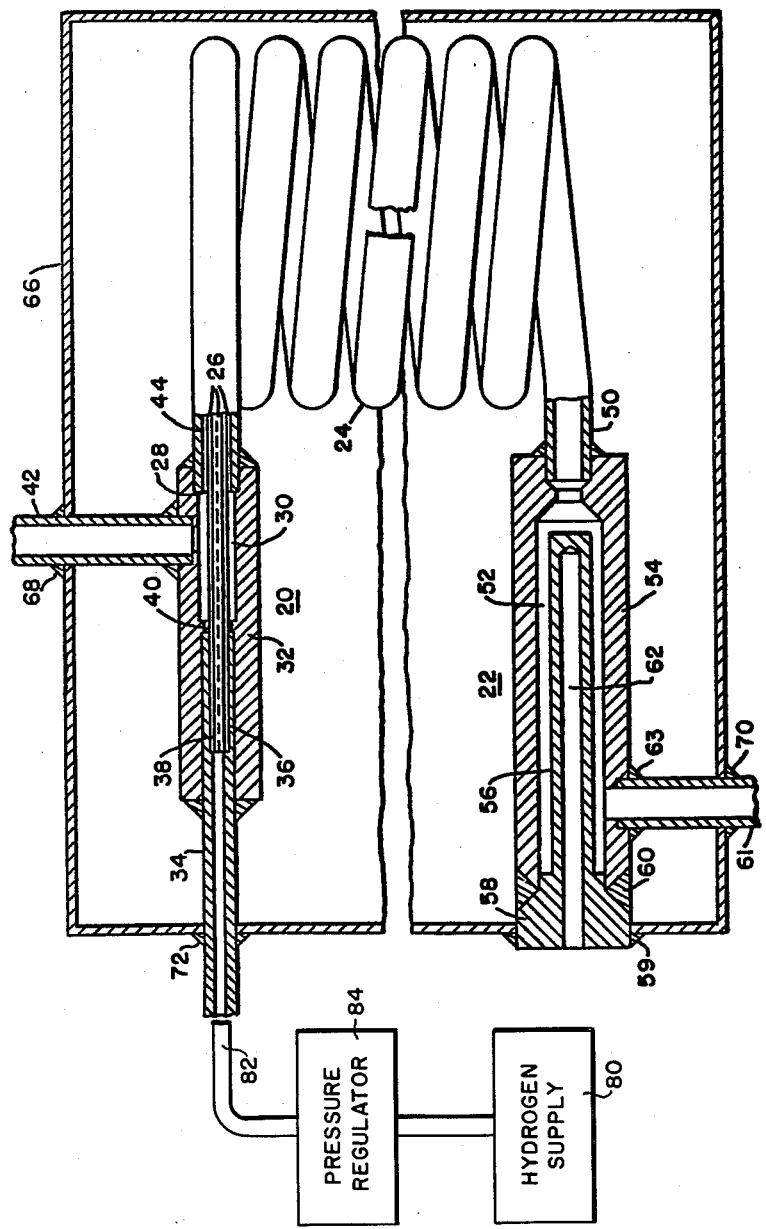

FIG. 4 a view similar to FIG. 1 of another embodiment of this invention illustrating another application thereof.

It is a well-known fact that some metals, for an example palladium, have a selective permeability to the diffusion of hydrogen gas from a mixture of gases. According to the invention, it has been determined that these metals present at least an equally selective permeability to hydrogen when the latter is dissolved in water or other liquid, along with a mixture of other gases likewise dissolved therein. Furthermore, it has been found that the diffusion rate of hydrogen from a water solution is sufficiently great to enable measurements thereof to be made with suitable apparatus employing tubing fabricated from a hydrogen-permeable metal and suspended in the liquid to be measured. Pursuant to the teachings of the invention, means are provided for permanently inserting a suitable length of such tubing into the system of which the hydrogen content is to be continuously monitored. The hydrogen gas which is dissolved in the pressurized water system passes through the selectively permeable walls of the palladium tubing and is conducted to a suitable manometer or other differential pressure measuring device situated outside of the sealed system. In the case of highly pressurized systems, which may be maintained at elevated temperatures, means are provided for hermetically sealing the components of the hydrogen gauge within the system and for thereby reducing or eliminating entirely the hazards heretofore encountered in removing samples from such systems for testing in prior hydrogen analyzers. In other aspects of the invention means are provided for continuously adding dissolved hydrogen to a liquid system and for maintaining the concentration thereof at a predetermined level.

Referring now more particularly to the drawings, the illustrative form of the invention shown therein comprises a hydrogen adapter indicated generally by the reference character 20, a thermocouple adapter indicated generally by the reference character 22 and a length of coiled tubing 24. Inserted within the tubing 24 and extending centrally thereof and substantially along the length of the coil are a plurality of palladium tubes 26, three being utilized in this example of the invention. The tubes 26 protrude outwardly through upper opening 28 of the coiled tubing 24 and through a water chamber 30 formed adjacent an end of a hydrogen adapter tube 32 and extending substantially centrally thereof. A metering tube or conduit 34 is inserted into the other end of the hydrogen adapter tube 32 for connecting the adapter tubes to a suitable pressure measuring device. The connecting tube 34 is provided adjacent an end thereof with a suitably enlarged cavity 36 into which the upper ends 38 of the palladium tubes 26 are inserted, as better shown in FIG. 2 of the drawings. The joint thus formed between the metering tube 34 and the palladium tubes 26 is hermetically sealed from the water chamber 30 by means of an annular sealing weld 40 applied to the end of the manometer connecting tube 34.

Communicating with the water chamber 30 of the hydrogen adapter tube 32 is a pressurized water inlet 42 through which pressurized water containing dissolved hydrogen and other gases is admitted to the chamber 30 which in turn communicates with annular space 44 surrounding the palladium tubes 26 and confined by the tubing 24. Lower ends 46 of the palladium tubes 26 are hermetically sealed as by welding the ends of the tubes to plugs 48 inserted respectively into the ends 46 of the palladium tubes.

With this arrangement, the water from which the dissolved hydrogen is being extracted selectively by the palladium tubes is brought into intimate contact with the tubes 26 throughout substantially the entire length of the coiled tubing 24. In order to increase the sensitivity of the hydrogen gauge, a plurality of palladium tubes 26 desirably are utilized as shown. The increased area of hydrogen permeation afforded by the plurality of tubes procures at a given temperature a greater amount of hydrogen from the hydrogen-containing water or other liquid passing through the coil 24. The increased pressure of the hydrogen thus collected within the palladium tubes 26 facilitates operation and reading of a pressure measuring device, for example, that which is described presently.

The water issuing from the other end 50 of the tubing 24 is conducted into a chamber 52 formed within a thermocouple adapter tube 54. The water then flows around an inwardly extending end 56 of a thermocouple well member 58. The well member 58 desirably is hermetically sealed to the thermocouple adapter tube 54 by means of an annular sealing weld 60 and is secured in a position such that the end portion 56 extends centrally of the chamber 52 and substantially along the length thereof. The pressurized water or other liquid containings dissolved hydrogen is exited through a conduit 61, preferably hermetically sealed to the thermocouple adapter tube 54 by an annular sealing weld 63, and communicating with the chamber 52 therein.

A suitable thermocouple element (not shown) is adapted for insertion within the cavity 62 formed within the thermocouple well member 58. The latter is hermetically joined to a pressurized container 66, mentioned hereinafter, by means of an annular sealing weld 59. With this arrangement the thermocouple cavity 62 opens exteriorly of the pressurized container for convenient insertion of the thermocouple element. With this arrangement, the temperature of the water flowing through the tubing 24 and around the palladium diffusion tubes 26 can be measured continuously and accurately. By maintaining the aforesaid temperature constant, the rate of diffusion of hydrogen gas dissolved in the water into the palladium tubing 26 will be dependent solely upon and will vary proportionately with the concentration of dissolved hydrogen. Thus, the palladium tubing can be coupled through the metering tube 34 directly, in this example, to a conventional manometer 64 or other suitable pressure measuring instrument (FIG. 3). The manometer 64 is calibrated to read directly the dissolved hydrogen concentration of the water or other liquid flowing through the coiled tubing 24 at a given temperature of the water, as indicated by the aforesaid thermocouple arrangement.

In the case of pressurized water, the pressure exerted upon the component parts of the hydrogen gauge, particularly the coiled tubing, is at least partially equalized by enclosing within a pressurized vessel or container 66 at least those portions of the hydrogen gauge containing pressurized liquid. The walls of the pressurized container or vessel desirably are hermetically sealed to the outlet and inlet conduits 42 and 61 respectively, as by the sealing welds 68 and 70. In a similar manner, the metering tube 34 can be sealed to the walls of the pressure vessel 66 by means of a sealing weld 72.

In operating the hydrogen gauge, referring to the schematic representation thereof shown in FIG. 3 of the drawings, pressurized water or other liquid containing dissolved hydrogen is admitted through inlet conduit 73 into the coiled tubing 24′, and is exited through outlet conduit 76. One or more palladium tubes 26′ which are suspended within the coiled tubing 24′, selectively absorb hydrogen from the gases dissolved in the liquid flowing through the coiled tubing 24′ and conduct the same by means of the metering tube 34′ to the manometer 64. Before taking a reading from the hydrogen gauge, the manometer 64 is reset and the accuracy thereof is ensured by evacuating the manometer 64, the hydrogen line 34′ and the palladium tubing 26′ to atmospheric pressure at which the zero reading of the manometer is calibrated in this arrangement. This is done by opening valve 78 and then shutting the same before a series of readings is taken. The manometer preferably is calibrated for a given constant temperature, as indicated by the aforesaid thermocouple arrangement, of the hydrogen-containing liquid in the water coil 24′ and obviously, a number of scales (not shown) may be furnished which are calibrated to read directly the dissolved hydrogen concentration from the manometer reading, at a number of respective temperatures encountered in using the hydrogen gauge. These temperatures are determined likewise by means of the thermocouple associated with the outlet conduit 76 through the use of the thermocouple adapter 22, as described heretofore in connection with FIG. 1 of the drawings. Instead of the manometer 64, a differential pressure transmitter and recording device can be coupled to the palladium tubes 26 to furnish a continuous and permanent record of the dissolved hydrogen concentration. It is contemplated that the thermocouple adapter 22 can be coupled, with equal efficiency, to the pressurized liquid inlet 42 (FIG. 1) since the hydrogen concentration reading is calibrated to a given constant temperature.

From the foregoing it will be apparent that a novel arrangement has been disclosed for quickly and continuously monitoring the dissolved hydrogen concentration of water or other liquid. The hydrogen gauge of the invention is adapted to be read directly and therefore requires only minimal skill for the operation thereof after the gauge has been initially calibrated for the given liquid and temperature at which the gauge is to be utilized. Moreover, the gauge can be connected permanently into the system with which the gauge is to be associated.

Numerous arrangements and modifications of the aforedescribed hydrogen gauge will appear to those skilled in the art without departing from the scope of the appended claims. In FIG. 4, for example, the disclosed device in other applications thereof is adapted to control the aforesaid dissolved hydrogen concentration within desired limits by admitting hydrogen into the palladium tubes 26 from a suitable source.

It is to be noted that the embodiment of FIG. 4 is similar to that shown in FIG. 1. Accordingly, like parts will be denoted with the same reference characters as FIG. 1 and will not be described in detail again.

In the FIG. 4 example of this invention, the interior of the hydrogen responsive tubes 26 is coupled to an external supply of hydrogen 80 by a conduit 82. The conduit 82 is connected to the metering tube 34 and admits hydrogen from the supply 80 to the interior of the tubes 26. Control means, such as a pressure regulator 84 is disposed in the conduit 82 to regulate the pressure of hydrogen in the tubes 26. The dissolved hydrogen concentration of the liquid passing through the tubing 24 tends to establish a permeational equilibrium with the hydrogen confined within the tubes 26. Thus, when the dissolved hydrogen concentration, in the liquid flowing through the coiled tubing 24, falls below a desired point, hydrogen permeates through the walls of the tubes 26 from the interior thereof to replenish the hydrogen content of the liquid, and vice versa.

Therefore, it is to be understood that the foregoing illustrative embodiments are exemplary in nature and that certain features of the invention can be utilized without a corresponding use of other features.

Accordingly, what is claimed as new is:

1. A hydrogen gauge for continuously monitoring the dissolved hydrogen concentration of a liquid system, said gauge comprising a length of coiled tubing; smaller tubing of hydrogen permeable material inserted into said coiled tubing and extending coaxially substantially along the length thereof, said last-mentioned tubing being hermetically sealed relative to the interior of said coiled tubing; a pressure measuring instrument; a conduit coupling said hydrogen-permeable tubing to said instrument; an inlet conduit coupled adjacent an end of said coiled tubing and communicating therewith; a thermocouple adapter tube connected adjacent the other end of said coiled tubing, said adapter tube having a cavity extending therethrough; a thermocouple well member having a portion thereof inserted into said cavity, said well member being secured and hermetically sealed to said adapter tube; an outlet conduit coupled to said adapter tube and communicating with said cavity, said outlet conduit being disposed adjacent the outer end of said thermocouple well member; and means for coupling said inlet and outlet conduits to said system.

2. A hydrogen gauge for continuously monitoring the dissolved hydrogen concentration of a liquid system, said gauge comprising a length of coiled tubing; a plurality of smaller coiled tubes of hydrogen-permeable material inserted into said tubing and extending substantially along the length thereof, said tubes being supported substantially centrally of said tubing and being disposed for intimate contact with the liquid of said system; means hermetically sealing said tubes relative to the interior of said tubing; a pressure measuring instrument; means coupling said tubes to said instrument; and inlet and outlet conduits secured respectively adjacent the ends of said coiled tubing and communicating therewith, said conduits being coupled to said system.

3. A device for maintaining the dissolved hydrogen content of a liquid system at a predetermined concentration, said device comprising a length of tubing; at least one tube of hydrogen-permeable material inserted into said tubing and extending substantially along the length thereof, said tube being hermetically sealed relative to the interior of said tubing; a source of hydrogen; means coupling said tube to said source; inlet and outlet conduits secured adjacent the ends of said tubing and communicating therewith; means for coupling said conduits to said system; and pressure regulating means forming part of said first-mentioned coupling means for supplying hydrogen at a substantially constant pressure to said tube, whereby said dissolved hydrogen content is maintained in equilibrium with said constant hydrogen pressure.

4. A method for maintaining the hydrogen content of a liquid in a liquid system at a predetermined concentration, said method comprising the steps of suspending a tube of hydrogen-permeable material in an elongated passage in said system, sealing said tube from the interior of said passage, flowing said liquid through said passage, and supplying hydrogen to the interior of said tube at a substantially constant pressure to establish permeational equilibrium between said hydrogen content of said system and said constant hydrogen pressure.

5. A device for maintaining the hydrogen content of a liquid in a liquid system at a predetermined concentration, said device comprising a length of tubing; at least one tube of hydrogen-permeable material inserted into said tubing and extending substantially along the length thereof, said tube being hermetically sealed relative to the interior of said tubing; a source of hydrogen; means coupling said tube to said source; inlet and outlet conduits secured adjacent the ends of said tubing and communicating therewith; temperature measuring means coupled to said tubing for measuring the temperature of said liquid flowing therethrough; means for coupling said conduits to said system; and pressure regulating means forming part of said first-mentioned coupling means for supplying hydrogen at a substantially constant pressure to said tube, whereby said hydrogen content is maintained in equilibrium with said constant hydrogen pressure at said liquid temperature.

6. A hydrogen gauge for continuously monitoring the hydrogen concentration of a fluid system, said gauge comprising a length of coiled tubing; smaller tubing of hydrogen permeable material inserted into said coiled tubing and extending coaxially substantially along the length thereof, said last-mentioned tubing being hermetically sealed relative to the interior of said coiled tubing; a pressure measuring instrument; a conduit coupling said hydrogen-permeable tubing to said instrument; an inlet conduit coupled adjacent an end of said coiled tubing and communicating therewith; a thermocouple adapter tube connected adjacent the other end of said coiled tubing, said adapter tube having a cavity extending therethrough; a thermocouple well member having a portion thereof inserted into said cavity, said well member being secured and hermetically sealed to said adapter tube; an outlet conduit coupled to said adapter tube and communicating with said cavity, said outlet conduit being disposed adjacent the outer end of said thermocouple well member; and means for coupling said inlet and outlet conduits to said system.

7. A hydrogen gauge for continuously monitoring the hydrogen concentration of a fluid system, said gauge comprising a length of tubing; smaller tubing of hydrogen permeable material inserted into said tubing and extending coaxially substantially along the length thereof, said last-mentioned tubing being hermetically sealed relative to the interior of said tubing; a pressure measuring instrument; a conduit coupling said hydrogen-permeable tubing to said instrument; an inlet conduit coupled adjacent an end of said tubing and communicating therewith; a thermocouple adapter tube connected adjacent the other end of said tubing, said adapter tube having a cavity extending therethrough; a thermocouple well member having a portion thereof inserted into said cavity, said well member being secured and hermetically sealed to said adapter tube; an outlet conduit coupled to said adapter tube and communicating with said cavity, said outlet conduit being disposed adjacent the outer end of said thermocouple well member;

and means for coupling said inlet and outlet conduits to said system.

8. A hydrogen gauge for continuously monitoring the hydrogen concentration of a fluid system, said gauge comprising a length of coiled tubing; a plurality of smaller coiled tubes of hydrogen-permeable material inserted into said tubing and extending substantially along the length thereof, said tubes being supported substantially centrally of said tubing and being disposed for intimate contact with the fluid of said system; means hermetically sealing said tubes relative to the interior of said tubing; a pressure measuring instrument; means coupling said tubes to said instrument; and inlet and outlet conduits secured respectively adjacent the ends of said coiled tubing and communicating therewith, said conduits being coupled to said system.

References Cited in the file of this patent

UNITED STATES PATENTS

| | | |
|---|---|---|
| 2,536,610 | King et al. | Jan. 2, 1951 |
| 2,671,336 | Hulsberg | Mar. 9, 1954 |
| 2,671,337 | Hulsberg | Mar. 9, 1954 |
| 2,817,350 | Bradner et al. | Dec. 24, 1957 |
| 2,882,212 | Beard | Apr. 14, 1959 |

FOREIGN PATENTS

| | | |
|---|---|---|
| 684,865 | Great Britain | Dec. 24, 1952 |